(12) United States Patent
Matsushita

(10) Patent No.: US 6,640,604 B2
(45) Date of Patent: Nov. 4, 2003

(54) LASER BENDING METHOD AND APPARATUS FOR BENDING A WORK PIECE IN NORMAL AND REVERSE DIRECTIONS

(75) Inventor: Naohisa Matsushita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/052,555

(22) Filed: Jan. 23, 2002

(65) Prior Publication Data

US 2002/0108427 A1 Aug. 15, 2002

(30) Foreign Application Priority Data

Feb. 14, 2001 (JP) ........................................ 2001-037647

(51) Int. Cl.[7] .............................................. B21D 37/16
(52) U.S. Cl. ........................ 72/342.1; 72/38; 72/342.94; 219/121.73; 219/121.85
(58) Field of Search ...................... 72/38, 342.1, 342.2, 72/342.5, 342.6, 342.94; 219/121.6, 121.65, 121.66, 121.73, 121.78, 121.79, 121.8, 121.81, 121.85

(56) References Cited

U.S. PATENT DOCUMENTS

| | | | | |
|---|---|---|---|---|
| 3,834,199 A | * | 9/1974 | Rouyer et al. .................. | 72/38 |
| 5,588,200 A | * | 12/1996 | Schudel .................... | 29/603.01 |
| 5,719,374 A | * | 2/1998 | Frackiewicz et al. .. | 219/121.66 |
| 6,011,239 A | * | 1/2000 | Singh et al. ............. | 219/121.6 |
| 6,423,160 B1 | * | 7/2002 | Arimoto et al. ............ | 148/325 |

FOREIGN PATENT DOCUMENTS

| | | |
|---|---|---|
| JP | 63-303237 | 12/1988 |
| JP | 7-80557 | 3/1995 |
| JP | 2878810 | 1/1999 |

* cited by examiner

*Primary Examiner*—Ed Tolan
(74) *Attorney, Agent, or Firm*—Armstrong, Westerman & Hattori, LLP

(57) ABSTRACT

A work piece can be bent in opposite directions by irradiating a laser beam onto one side of the work piece. A tension anneal is applied to a metal plate. The metal plate is bent by irradiating a defocused laser beam onto a front surface of the tension-annealed metal plate so that the metal plate is bent in a state in which the front surface of the metal plate is convex at a position where the laser beam is scanned.

12 Claims, 5 Drawing Sheets

CONCAVE BENDING (NORAL DIRECTION BENDING)

CONVEX BENDING (REVERSE DIRECTION BENDING)

FIG.3

LASER OSCILLATOR : PULSED OSCILLATION YAG LASER   WORK PIECE : SUS304-CSP/20 μm

| No. | WORK PIECE | PROCESS CONDITION | PULSE WIDTH | PULSE ENERGY | PULSE RATE | SCAN SPEED | SPOT DIA. | DIRECTION OF DEFORMATION | ANGLE OF DEFORMATION |
|---|---|---|---|---|---|---|---|---|---|
| 1 | TENSION ANNEALED | A | 0.2mS | 3mJ/R | 50Hz | 100mm/min | 0.2mm | 凸 | 3.0° |
| 2 | | | | 7 | | | 0.4 | 凹 | 1.0° |
| 3 | | B | | 3 | | | 0.2 | 凸 | 6.0° |
| 4 | | | | 7 | | | 0.4 | 凸 | 2.2° |
| 5 | NON-TENTION ANNEALED | A | | 3 | | | 0.2 | 凸 | 8.5° |
| 6 | | | | 7 | | | 0.4 | 凸 | 3.0° |
| 7 | | B | | 3 | | | 0.2 | 凸 | 7.0° |
| 8 | | | | 7 | | | 0.4 | 凸 | 2.2° |

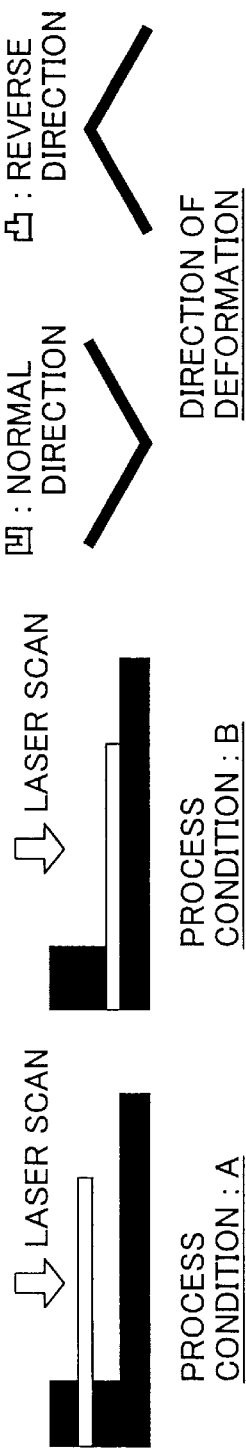

凸 : NORMAL DIRECTION

凹 : REVERSE DIRECTION

DIRECTION OF DEFORMATION

⇨ LASER SCAN

PROCESS CONDITION : A

⇨ LASER SCAN

PROCESS CONDITION : B

LASER BENDING METHOD AND APPARATUS FOR BENDING A WORK PIECE IN NORMAL AND REVERSE DIRECTIONS

BACKGROUND OF THE INVENTION

1. Field of the Invention

The present invention generally relates to laser machining and, more particularly, to a laser bending method and apparatus for bending a thin metal plate by irradiation of a laser beam.

2. Description of the Related Art

There is known a technology in which a laser beam is irradiated so as to bend a thin metal plate or correct warpage of a thin metal plate. In a conventional laser bending method of a thin metal plate, a laser beam is focused on a surface of a thin metal plate as a work piece (referred to as a just focused state) so as to efficiently bend the thin metal plate.

In the conventional laser bending method, the front side of the thin metal plate is heated to a predetermined temperature by irradiation of a laser beam, but the backside of the thin metal plate is not to be heated. The work piece to be machined is bent by utilizing a phenomenon that the work is self bent due to a difference in stresses generated in the front side and the back side of the work while the heated portion is being cooled. In this case, the work piece is bent in a state in which the front side of the work is a concave surface. That is, the work piece is concave toward the laser beam.

Thus, according to the conventional laser bending method, a difference in temperatures between the front surface and the back surface is generated by quickly heating a front surface of a work piece before a temperature of a back surface of the work piece increases due to irradiation of a laser beam in a just focused state or close to the just focused state. Especially, in a case where irradiation of a laser beam is carried out in a state in which a work piece is placed on a support table such as a jig, a difference in a temperature between the back surface and the front surface in a laser beam irradiated portion of the work since a large amount of heat is released to the jig from the back surface of the work piece (the surface contacting the jig).

According to the above-mentioned conventional laser bending method, it has been thought that a work piece such as a thin metal plate could be bent in a direction in which the work piece is concave toward the laser beam. That is, in the bending method in which a work piece is bent by a difference in stresses within the work piece caused by heating by laser beam irradiation and cooling, the laser irradiated side (front surface) of the work piece has a larger contraction than the backside of the work piece during a process in which a portion of the laser irradiated side is rapidly heated and then rapidly cooled. For this reason, it has been thought that the work piece is bent in the direction in which the work piece is concave toward the laser beam. Therefore, it has been thought that a work piece cannot be bent in a direction in which the work piece is convex toward the laser beam.

Thus, when a work piece is needed to be bent in opposite directions, a laser beam is irradiated on both the front and back surfaces of the work piece. That is, an individual laser irradiation head is provided on each of the front and back sides of the work piece, or a mechanism for turning the work piece is provided. As mentioned above, when the work piece is required to be bent in opposite directions, a structure of the laser bending machine becomes complex, and a manufacturing cost of the laser bending machine is increased.

Among many work pieces, there is a case in which a coil or a mold part is previously formed on one side of the work piece such as a component part use as a contact of a relay. In such a work piece, since a laser beam cannot be irradiated from a backside of the work piece, bending is limited to only one direction. Therefore, it is difficult for the conventional laser bending machine to bend a work piece in opposite directions, and there is a problem in that if an amount of bending is in excess, a correction cannot be carried out by bending in opposite directions.

For example, there is a case in which a laser bending method is used for adjusting or correcting a roll angle or a pitch angle of a suspension which elastically supports a magnetic head. In this case, each of the roll angle and the pitch angle can be adjusted by irradiation of a laser beam in one direction. However, there is a problem in that an end position of the suspension is shifted due to the laser beam irradiation in one direction, and it is difficult to adjust the roll and pitch angles while maintaining accurate dimensions of the suspension. Moreover, a suspension for a magnetic head is provided with a signal transmission conductive pattern on a backside thereof, and, thus, there is a problem in that a laser beam cannot be irradiated onto the backside and bending can be carried out only in one direction.

SUMMARY OF THE INVENTION

It is a general object of the present invention to provide an improved and useful laser bending method and apparatus in which the above-mentioned problems are eliminated.

A more specific object of the present invention is to provide a laser bending method and apparatus which can bend a work piece in opposite directions by irradiating a laser beam onto one side of the work piece.

In order to achieve the above-mentioned objects, there is provided according to one aspect of the present invention a laser bending method of a metal plate, comprising the steps of: applying tension anneal to the metal plate; and bending the metal plate by irradiating a defocused laser beam onto a front surface of the tension-annealed metal plate so that the metal plate is bent in a state in which the front surface of the metal plate is convex at a position where the laser beam is scanned.

Additionally, there is provided according to another aspect of the present invention a laser bending apparatus for a metal plate, comprising: a laser oscillator; an optical system converging a laser beam from the laser oscillator and irradiating the laser beam onto the metal plate; a focus control mechanism controlling a focus of the laser beam so that the laser beam converged by the optical system is irradiated onto a front surface of the metal plate in a defocused state; a work support mechanism supporting the metal plate by supporting a portion of the metal plate other than a laser-irradiated portion on which the laser beam is irradiated in a state in which the laser-irradiated portion is floated in air; and a scan mechanism moving at least one of the optical system and the work support mechanism so as to scan the laser beam on the front surface of the metal plate.

According to the present invention, by irradiating laser beam onto the metal plate in a predetermined defocused state, the tension-annealed metal plate can be bent in a state where the metal plate is convex toward the irradiated laser beam. Therefore, bending in both a normal direction and a reverse direction can be achieved by irradiating the laser beam onto the front surface of the metal plate without irradiating the laser beam on the back surface of the metal plate. Thereby, a laser bending apparatus for bending a work piece in the normal and reverse directions can be made with a simple structure. Additionally, a laser bending apparatus, which has been conventionally used for bending a work piece in one direction, can be changed to a laser bending apparatus for bending a work piece in the normal and reverse directions with a simple modification. Moreover, even if the laser irradiation on the back surface is difficult, desired bending can be carried out by merely irradiating the laser beam on the front surface of the work piece.

In the present invention, the laser beam may be irradiated onto the metal plate while a portion to be irradiated by the laser beam is floated in air by supporting a part of the metal plate other than the portion to be irradiated by the laser. Additionally, a temperature of the metal plate may be controlled by a gas having a predetermined temperature being brought into contact with a back surface opposite to the front surface of the metal plate. The gas may be a hot air heated at the predetermined temperature, and the hot air may be blown toward the back surface of the metal plate. Alternatively, the gas may be a cold air cooled at the predetermined temperature, and the cold air may be blown toward the back surface of the metal plate.

Other objects, features and advantages of the present invention will become more apparent from the following detailed description when read in conjunction with the accompanying drawings.

BRIEF DESCRIPTION OF THE DRAWINGS

FIG. 3 is an illustration for explaining results of experiments;

DETAILED DESCRIPTION OF THE PREFERRED EMBODIMENTS

A description will now be given, with reference to the drawings, of an embodiment of the present invention.

First, a description will be given, with reference to FIG. 1, of an outline of a laser bending method according to the present invention. The laser bending method according to the present invention is characterized by the ability to bend a thin metal plate as a work piece to be convex when viewed in a direction of irradiation of a laser beam. Hereafter, a direction of bending, which forms a concave shape in a direction of irradiation of a laser beam, is referred to as a normal direction, and a direction of bending, which forms a convex shape in a direction of irradiation of a laser beam, is referred to as a reverse direction.

Figure 1:
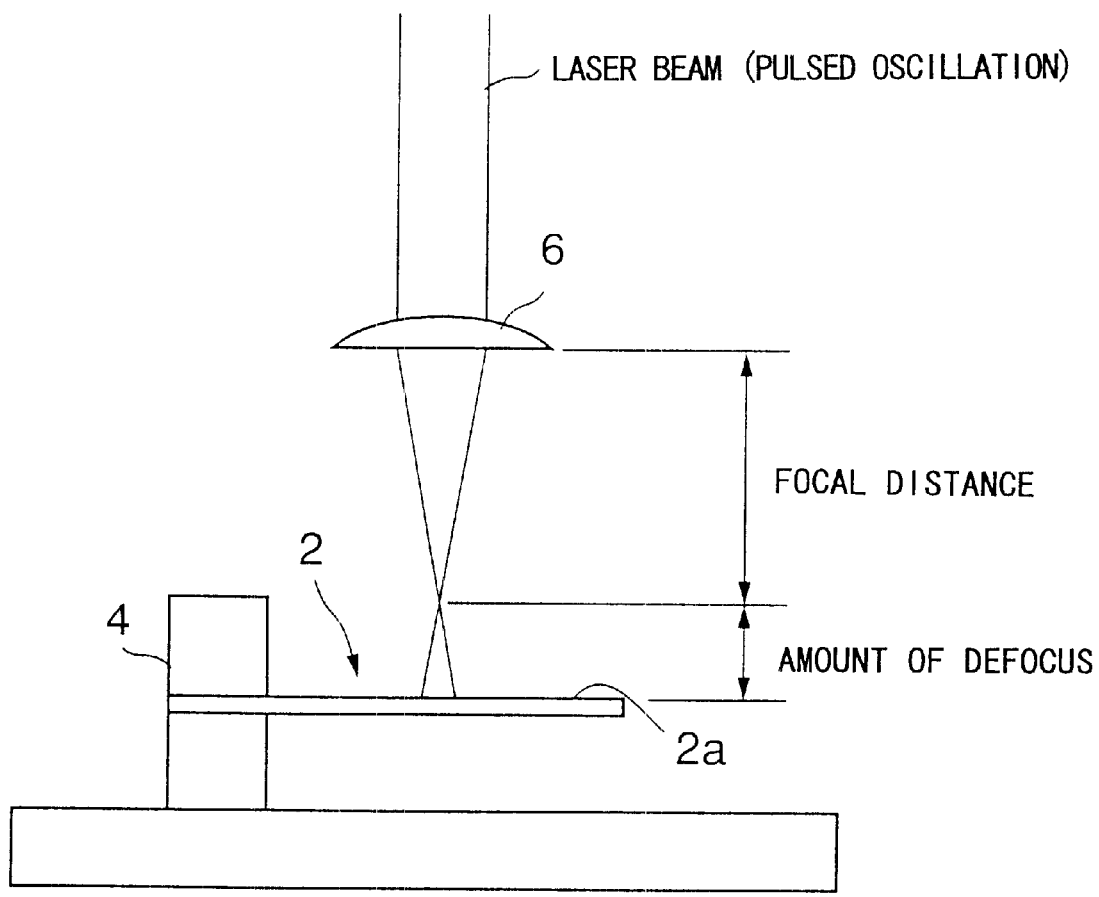
FIG. 1 is an illustration showing a condition of laser bending of a work piece in a state where the work piece is convex toward an irradiated laser beam.

FIG. 1 shows a condition in the case of bending a thin metal plate in the reverse direction, that is, bending a thin metal plate in a convex shape when viewed in a direction of irradiation of a laser beam. In order to achieve bending in the reverse direction, it is important to adjust focusing of the laser beam to irradiate. In order to achieve bending in the normal direction, the focus of the laser beam is adjusted so that the laser beam is focused on the front surface of the thin metal plate as a work piece. The inventor found that bending in the reverse direction can be achieved by irradiation of a laser beam by intentionally shifting a focal point (referred to as defocus) of the laser beam. Although it is considered that the defocus of a laser beam is essential to the condition for achieving the reverse direction bending, there are various conditions to be satisfied to achieve the reverse direction bending.

In the example shown in FIG. 1, an end of a thin metal plate 2 as a work piece is supported by a material support jig 4, and laser irradiation is performed in a state where a laser irradiated position of the thin metal plate 2 floats in the air. As mentioned above, the laser beam irradiated onto a surface of the thin metal plate 2 is made into a predetermined defocus state. That is, the laser beam is irradiated onto the thin metal plate 2 in a state where the laser beam projected from a laser oscillator (not shown in the figure) is diverged after being converged at the focal point of a condenser lens 6. Here, a magnitude of defocus (an amount of defocus) can be expressed by a distance between a surface 2a of the thin metal plate onto which the laser beam is irradiated and the focal point of the condenser lens 6. Moreover, an amount of defocus can also be expressed by a diameter of a laser spot formed on the laser-irradiated surface 2a of the thin metal plate 2. An amount of defocus is small as the diameter of the laser spot on the laser-irradiated surface 2a of the thin metal plate 2 is small (less defocus). Contrary, an amount of defocus is large as the diameter of the laser spot on the laser-irradiated surface 2a of the thin metal plate 2 is large (large defocus).

Figure 2A:
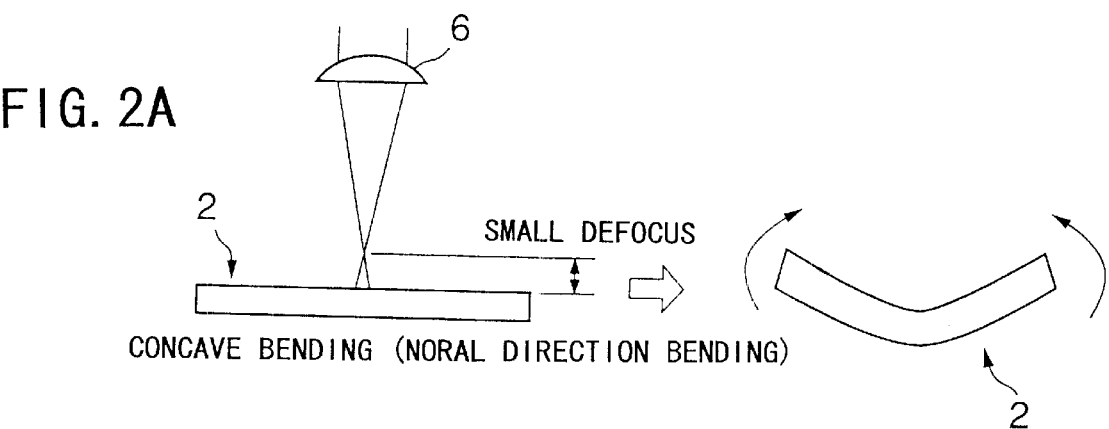
FIG. 2A is an illustration for explaining laser bending in a normal direction.
Figure 2B:
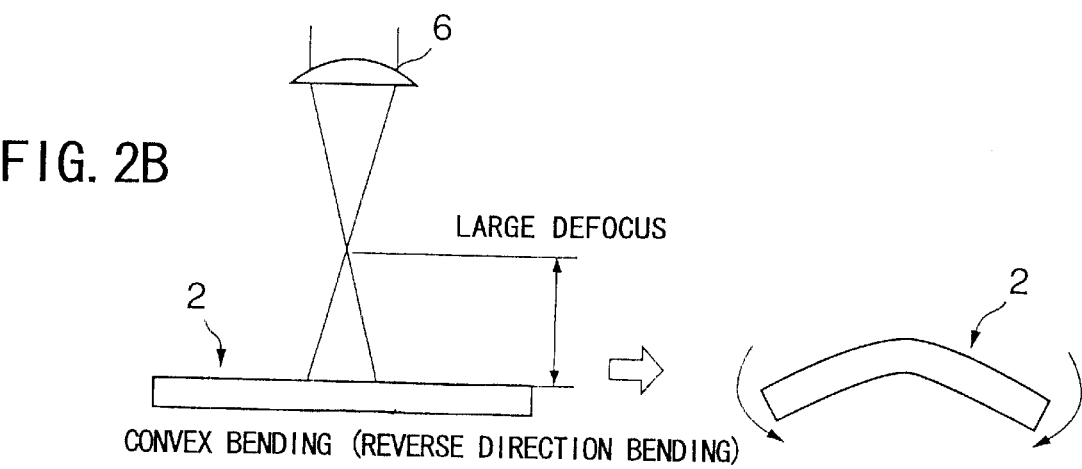
FIG. 2B is an illustration for explaining laser bending in a reverse direction.

Here, if an amount of defocus is small as shown in FIG. 2A, the thin metal plate 2 bends in the normal direction. That is, the thin metal plate 2 can be bent in the normal direction by positioning the laser-irradiated surface 2a of the thin metal plate 2 in the vicinity of the focal point of the condenser lens 6. On the other hand, if an amount of defocus is large as shown in FIG. 2B, the thin metal plate 2 bends in the reverse direction. That is, the thin metal plate 2 can be bent in the reverse direction by positioning the thin metal plate 2 by shifting from the focal point of the condenser lens 6.

In addition to the above-mentioned condition, pretreatment of a work piece and the kind of laser beam are important conditions for the laser bending method according to the present invention. The pretreatment of a work piece is a tension anneal applied to the work piece. The tension anneal is a process in which a material is annealed while a tension force of a certain level is applied to the material. The material after the tension anneal has a tension stress of a predetermined magnitude remaining therein. In the laser bending method according to the present invention, the reverse direction bending can be achieved by previously applying a tension anneal to a work piece.

The laser beam irradiated onto the work piece is preferably a pulsed oscillation laser. Although the reverse direction bending can be attained even if the laser beam is continuous oscillation laser, the pulsed oscillation laser can attain the reverse direction bending more easily. Moreover, the laser irradiated onto the work piece is preferably a single mode oscillation laser. In the experiments carried out by the inventor, the reverse direction bending was not able to be attained by a multi-mode oscillation laser.

According to the laser bending method according to the present invention, the reverse direction bending can be attained by optimizing each of the above-mentioned conditions. The inventor carried out various experiments by changing the above-mentioned conditions, and found the condition which can achieve the reverse direction bending. FIG. 3 is an illustration for explaining results of the experiments.

In the experiments, a stainless steel plate for spring, SUS304-CSP, was used as a work piece. A thickness of the plate was set to 20 $\mu$m. The tension-annealed stainless steel plate, which was not subjected to the tension anneal, and the non-tension-annealed stainless steel plate, which was not subjected to the tension anneal were prepared. The experiments were carried out according to two supporting methods (process condition A and process condition B) for each of the tension-annealed plate and the non-tension-annealed plate. That is, in the process condition A, the laser beam was irradiated in a state where the laser irradiated part is floated in the air by supporting an end of the work piece. Moreover, in the process condition B, the work piece was placed on a surface of a jig, and the laser beam was irradiated (scanned) in a state where the backside of the work piece contacts the surface of the jig.

A pulsed oscillation YAG laser oscillator was used as a laser beam source, and a single mode laser beam was oscillated. A pulse width was 0.2 ms and a pulse rate, i.e., a pulse frequency was 50 Hz. The experiments were carried out by setting laser energy to two levels of 3 mJ/P and 7 mJ/P.

The laser beam projected from the above-mentioned laser oscillator was converged by an optical system including a condenser lens so that the laser spot diameter on the laser-irradiated surface of the stainless steel plate as a work piece becomes 0.2 mm and 0.4 mm, and the laser beam was linearly scanned on the laser-irradiated surface at a scan rate of 100 mm/min. The case in which the laser spot diameter is 0.2 mm is an example where an amount of defocus of the laser beam is small, and the case in which the laser spot diameter is 0.4 mm is an example where an amount of defocus of the laser beam is large.

The experiments were carried out in accordance with the above-mentioned conditions, and the stainless steel plate was bent in the reverse direction when the tension-annealed stainless steel plate was supported so as to be floated in the air (process condition A) and the laser beam having a large amount of defocus (spot diameter of 0.4 mm) was irradiated with energy of 7 mJ/P as shown in No. 2 of FIG. 3. A bent angle was 1 degree for one scan.

Although the bent angle varied due to other conditions, all the stainless steel plates were bent in the normal direction. For example, No. 4 and No. 2 of FIG. 3 differed from each other by the process condition, and the directions of bending were opposite to each other only with such a difference.

Thus, although it seemed that various conditional factors acted mutually in the condition to bend in the reverse direction, it was confirmed by repeated experiments in the same condition that there is a sufficient reproducibility. Moreover, although the stainless steel plate was used as a work piece in the above-mentioned experiments, it was found that other plates such as a thin phosphor bronze plate or a thin copper plate can also be bent by a laser beam in the same manner.

Here, attention is paid to the conditions of No. 1 and No. 2 shown in FIG. 3 with respect to the direction of bending. The factors which differentiated the conditions of No. 1 and No. 2 were laser energy and the size of the laser spot diameter. That is, stainless steel plate was bent in the normal direction under the condition of No. 1 by making the laser energy to 3 mJ/P and setting the diameter of the laser spot to 0.2 mm. On the other hand, the stainless steel plate was bent in the reverse direction under the condition of No. 2 by making laser energy to 7 mJ/P and setting the diameter of the laser spot to 0.4 mm.

Therefore, bending in both the normal direction and the reverse direction can be achieved by irradiating the laser beam from the same direction by increasing the laser energy and increasing the laser spot diameter (increasing an amount of defocus). That is, both the normal direction bending and the reverse direction bending can be achieved by merely controlling a laser power and an amount of defocus while supporting a work piece by a supporting jig.

It should be noted that a deformation angle shown in FIG. 3 is an angle formed by a single laser scan, and the deformation angle can be increase by repeating the laser scan at the same position. A bent angle of more than 90 degrees was able to form by repeating the laser scan many times. Additionally, round shape bending can also be achieved by sequentially shifting the scan position while repeating the laser scan.

As mentioned above, one of the conditions to achieve the laser bending according to the present invention is to support a work piece in a state in which a portion of the work piece to be irradiated by a laser beam is floated in the air. This condition is considered to be a condition in which a heat is prevented from being released from the backside of the work piece. Moreover, it is considered that a temperature of a work piece during the laser machining influences the direction of bending or a bending angle. Bending occurs in a work piece when a temperature of a part of the work piece rapidly rises and then the part is cooled. Therefore, it is considered that the temperature control of a work piece is an important factor of the laser bending.

In the bending method according to the present invention, since the bending is performed while a work piece is floated in the air, an air (hot air or cold air) can be blown toward a back surface $2b$ of the thin metal plate 2 as a work piece. Thereby, the temperature of the thin metal plate 2 can be heated or cooled to a predetermined temperature before irradiation of a laser beam. Although FIG. 4 shows an air blown toward the thin metal plate 2, a medium to be blown is not limited to an air and, for example, a nitrogen gas or a carbon dioxide gas may be blown.

Figure 4:
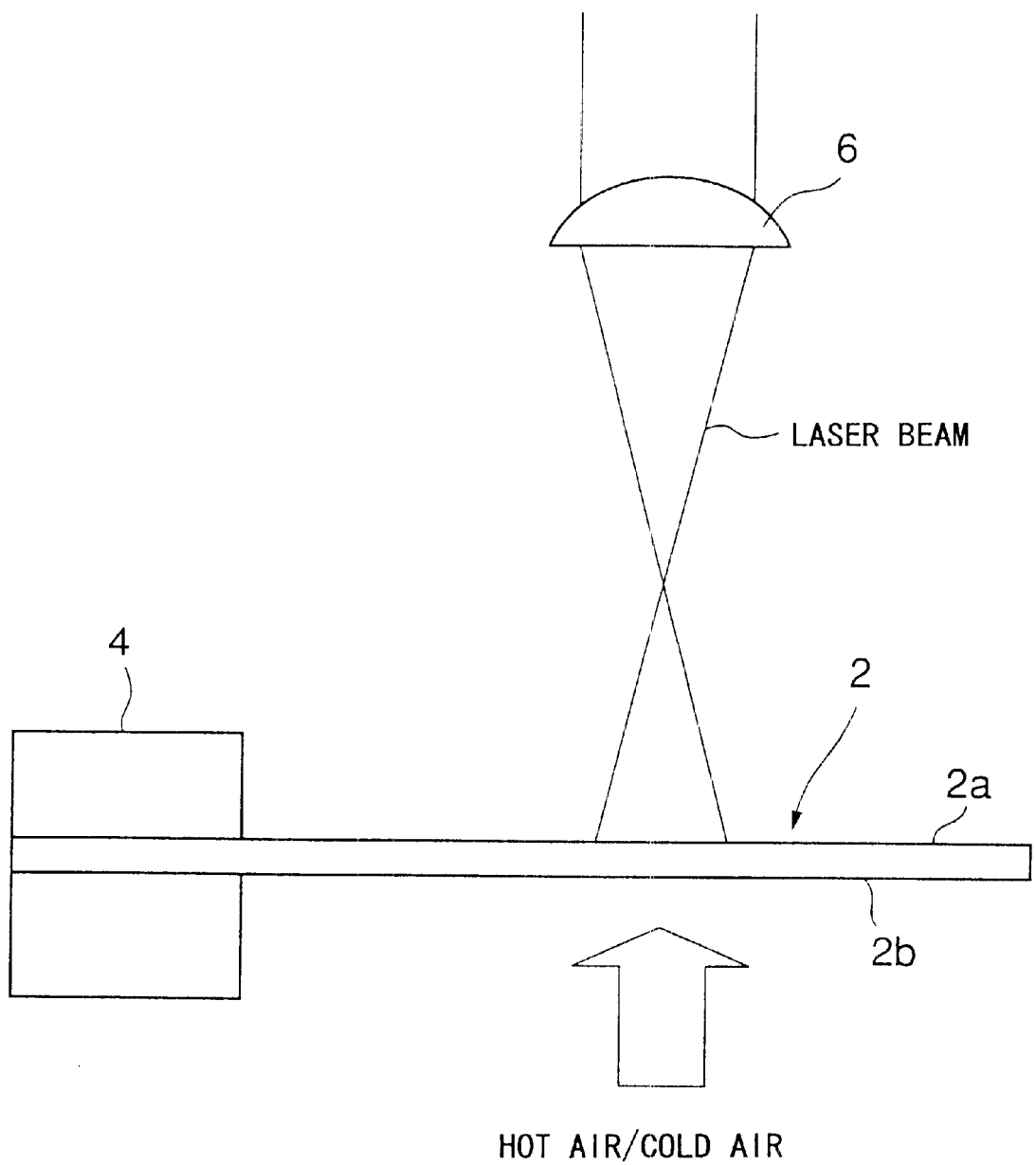
FIG. 4 is an illustration showing a control of a temperature of a work piece by blowing a not or cold air.

According to the temperature control method shown in FIG. 4, the normal direction bending and the reverse direction bending can be attained more efficiently. For example, the air blow is not carried out in the normal direction bending, and hot air is blown toward the back surface $2b$ of the thin metal film 2 when performing the reverse direction bending. Moreover, when performing the normal direction bending, the bending angle achieved by a single laser scan can be increased by increasing a temperature difference between the front and back surfaces of the thin metal plate 2 by blowing cold air toward the back surface $2b$ of the thin metal plate 2. Thus, efficient laser bending can be performed by blowing air of a predetermined temperature toward the back surface $2b$ of the thin metal plate 2 based on a desired laser bending.

A description will now be given, with reference to FIG. 5, of a laser bending apparatus for performing laser bending by the laser bending method according to the present invention.

Figure 5:
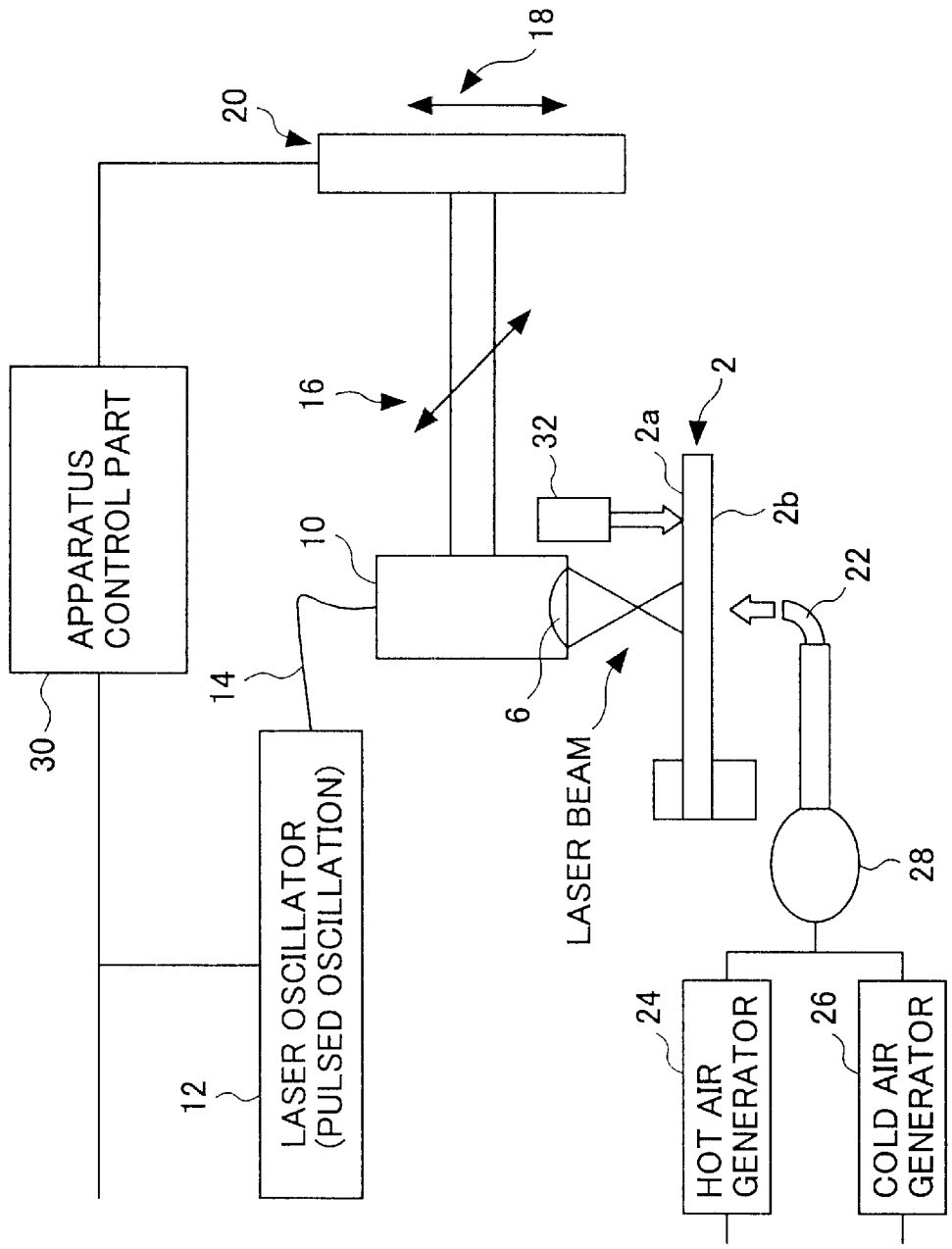
FIG. 5 is a diagram of a structure of a laser bending apparatus according to the present invention.

In FIG. 5, the thin metal plate 2 as a work piece is supported by a material support jig 4 with the laser-irradiated surface (front surface) $2a$ facing upward. The material support jig 4 serves as a work support mechanism, and an end of the thin metal plate 2 is supported by the material support jig 4 so that the laser-irradiated position is in a floating state.

A laser condensing head 10 is located above the thin metal plate 2. The laser condensing head 10 has an optical system containing a condenser lens 6, and irradiates a laser bean onto the laser-irradiated surface 2a of the thin metal plate 2 while condensing the supplied laser beam. The laser beam supplied to the laser condensing head 10 is generated by a laser oscillator 12 which performs a pulsed oscillation. The laser beam from the laser oscillator 12 is supplied to the laser condensing head 10 through an optical fiber 14.

The laser condensing head 10 is capable of being moved in a horizontal direction (a direction of X-Y) and a perpendicular direction (a direction of Z). That is, the laser condensing head 10 is horizontally movable by an X-Y moving mechanism 16. By horizontally moving the laser condensing head 10, the laser beam can be scanned on the laser-irradiated surface 2a of the thin metal plate 2 without changing the diameter of the laser spot. Therefore, the X-Y moving mechanism corresponds to a laser scanning mechanism.

Moreover, the laser condensing head 10 is movable in the vertical direction by a Z moving mechanism 18. By vertically moving the laser condensing head 10, a distance between the focal point of the condenser lens 6 and the laser-irradiated surface 2a of the thin metal plate 2 is changeable. That is, the Z moving mechanism corresponds to a focus control mechanism of a laser beam. Therefore, an amount of defocus of a laser beam is controllable by vertically moving the laser condensing head 10. The X-Y moving mechanism 16 and the Z moving mechanism 18 together form a laser condensing head drive part 20.

It should be noted that, although the laser condensing head 10 is moved so as to perform a control of the laser scanning and an amount of defocus, the laser scanning and adjustment of an amount of defocus can also be performed by moving the work piece 2 by driving the material support jig 4.

The back surface 2b of the thin metal plate 2 as a work piece is provided with a gas injection nozzle 22. The gas injection nozzle 22 blows a gas heated or cooled at a predetermined temperature toward the back surface 2b of the thin metal plate 2. The laser bending apparatus shown in FIG. 5 controls the temperature of the thin metal plate 2 by blowing the air heated or cooled at the predetermined temperature from the gas injection nozzle 22.

The air blown from the gas injection nozzle 22 is generated by a hot air generator 24 comprising an electric heater or the like or a cold air generator 26 comprising a cooler or the like, and is supplied to the gas injection nozzle 22 by a pump 28 as an air blower. That is, when heating the thin metal plate 2, the air from the hot air generator 24 is blown from the gas injection nozzle 22, and when cooling the thin metal plate 2, the air from the cold air generator 26 is blown from the gas injection nozzle 22.

The laser oscillator 12, the laser condensing head drive part 20, the hot air generator 24, the cold air generator 26 and the pump 28 are controlled by an apparatus control part 30 so that a desired laser bending can be carried out.

Moreover, the laser bending apparatus shown in FIG. 5 is provided with a sensor 32, which measures a displacement and a spring force of the thin metal plate 2 in real time. A measuring operation of the sensor 32 is also controlled by the apparatus control part 30. Thereby, the thin metal plate 2 can be bent at an accurate angle since the laser bending can be carried out while measuring the bending angle of the thin metal plate.

Moreover, when the thin metal plate 2 is a leaf spring such as a suspension of a magnetic head and when correcting a spring force of the leaf spring by laser bending, a desired spring force can be obtained by performing the laser bending while measuring the spring force by the sensor 32. In this case, since bending in both the normal direction and reverse direction can be carried out while the suspension is supported, the correction of the spring force can be efficiently performed.

In addition, in the above-mentioned embodiment, although a YAG laser can be used as the laser oscillator 12, the laser oscillator 12 is not limited to the YAG laser and, for example, a carbon dioxide ($CO_2$) laser or the like may be used if it has a required laser power.

As mentioned above, according to the laser bending method and apparatus according to the present invention, only by controlling an amount of irradiation energy and an amount of defocus of a laser beam, laser bending in both the normal and reverse directions can be achieved. For this reason, it is not necessary to use two or more laser irradiation heads, and the structure of the laser bending apparatus is simplified.

Moreover, if a separate part is mounted on the back surface of the work piece, an arbitrary shape or an arbitrary spring force can be obtained by merely controlling the conditions of leaser irradiation if a part of the front surface of the work piece is exposed. For this reason, laser bending is applicable also to a product, which was conventionally difficult to process.

Moreover, the pitch and roll of a suspension are correctable while maintaining desired accuracy since the laser bending can be carried out by laser irradiation on the front side even when a material receiving damage by laser irradiation is provided on the back surface of a member such as a suspension of a magnetic head.

The present invention is not limited to the specifically disclosed embodiments, and variations and modifications may be made without departing from the scope of the present invention.

The present application is based on Japanese priority application No. 2001-037647 filed on Feb. 14, 2001, the entire contents of which are hereby incorporated by reference.

What is claimed is:

1. A laser bending method of a metal plate, comprising the steps of:
    applying tension anneal to the metal plate; and
    bending said metal plate by irradiating a defocused single mode laser beam onto a front surface of said tension-annealed metal plate so that said metal plate is bent in a state in which said front surface of said metal plate is convex at a position where the laser beam is scanned.

2. The laser bending method as claimed in claim 1, wherein the laser beam is irradiated onto said metal plate while a portion to be irradiated by the laser beam is floated in air by supporting a part of said metal plate other than the portion to be irradiated by the laser.

3. The laser bending method as claimed in claim 2, wherein a temperature of said metal plate is controlled by a gas having a predetermined temperature being brought into contact with a back surface opposite to said front surface of said metal plate.

4. The laser bending method as claimed in claim 3, wherein the gas is a hot air heated at the predetermined temperature, and the hot air is blown toward said back surface of said metal plate.

5. The laser bending method as claimed in claim 3, wherein the gas is a cold air cooled at the predetermined temperature, and the cold air is blown toward said back surface of said metal plate.

6. A laser bending apparatus for a metal plate, comprising:

a laser oscillator;

an optical system converging a single mode laser beam from said laser oscillator and irradiating the laser beam onto the metal plate;

a focus control mechanism controlling a focus of the laser beam so that the laser beam converged by said optical system is irradiated onto a front surface of said metal plate in a defocused state;

a work support mechanism support said metal plate by supporting a portion of said metal plate other than a laser-irradiated portion on which the laser beam is irradiated in a state in which the laser-irradiated portion is floated in air; and a scan mechanism moving at least one of said optical system and said work support mechanism so as to scan the laser beam on said front surface of said metal plate.

7. The laser bending apparatus as claimed in claim 6, wherein said focus control mechanism controls a distance between a focal point of said optical system and said front surface of said metal plate.

8. The laser bending apparatus as claimed in claim 6, wherein said laser oscillator is a single mode pulsed oscillation laser oscillator.

9. The laser banding apparatus as claimed in claim 6, further comprising a gas injection nozzle which blows a gas having a predetermined temperature toward a back surface opposite to the front surface of said metal plate.

10. The laser bending apparatus as claimed in claim 9, wherein the gas blown from said gas injection nozzle is an air, and further comprising an air blower to deliver the air and a temperature control device to heat of cool the air at the predetermined temperature.

11. A laser bending method of a metal plate, comprising the steps of:

applying tension anneal to the metal plate; and bending said metal plate by irradiating a defocused laser beam onto a front surface of said tension-annealed metal plate so that said metal plate is bent at a position where the laser beam is scanned; and varying the degree of laser beam defocus for selectively obtaining normal direction bending or reverse direction bending.

12. A laser bending apparatus for a metal plate, comprising:

a laser oscillator;

an optical system converging a laser beam from said laser oscillator and irradiating the laser beam onto the metal plate;

a focus control mechanism controlling a focus of the laser beam so that the laser beam converged by said optical system is irradiated onto a front surface of said metal plate in a defocused state;

a work support mechanism supporting said metal plate by supporting a portion of said metal plate other than a laser-irradiated portion on which the laser beam is irradiated in a state in which the laser-irradiated portion is floated in air;

a scan mechanism moving at least one of said optical system and said work support mechanism so as to scan the laser beam on said front surface of said metal plate and a defocus control mechanism operative to vary the position of the focal point of the laser beam with respect to the metal plate to selectively obtain normal bending or reverse bending thereof.

* * * * *